(12) United States Patent
Donato

(10) Patent No.: US 8,091,100 B2
(45) Date of Patent: Jan. 3, 2012

(54) PROMPTING OF AUDIENCE MEMBER IDENTIFICATION

(75) Inventor: Paul Donato, New York, NY (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 1631 days.

(21) Appl. No.: 09/883,546

(22) Filed: Jun. 18, 2001

(65) Prior Publication Data

US 2002/0198762 A1    Dec. 26, 2002

(51) Int. Cl.
*H04H 60/33* (2008.01)
(52) U.S. Cl. .............. 725/10; 725/11; 725/12; 725/46; 709/224; 348/587; 382/103
(58) Field of Classification Search .............. 725/9–21, 725/46; 348/327, 565, 587, 592, 906; 709/217–231; 382/103, 115–119
See application file for complete search history.

(56) References Cited

U.S. PATENT DOCUMENTS

| | | | | |
|---|---|---|---|---|
| 4,769,697 A | * | 9/1988 | Gilley et al. ................ 725/12 |
| 4,779,198 A | | 10/1988 | Lurie | |
| 4,931,865 A | * | 6/1990 | Scarampi .................. 725/12 |
| 5,251,324 A | * | 10/1993 | McMullan, Jr. .............. 725/14 |
| 5,373,315 A | * | 12/1994 | Dufresne et al. ............. 725/11 |
| 5,550,928 A | * | 8/1996 | Lu et al. .................. 382/116 |
| 5,564,088 A | | 10/1996 | Saitoh | |
| 5,749,043 A | * | 5/1998 | Worthy .................. 455/2.01 |
| 5,758,257 A | * | 5/1998 | Herz et al. ................ 725/116 |
| 5,771,307 A | | 6/1998 | Lu et al. | |
| 5,794,210 A | | 8/1998 | Goldhaber et al. | |
| 5,872,588 A | * | 2/1999 | Aras et al. .................. 725/14 |
| 5,945,988 A | * | 8/1999 | Williams et al. ............. 715/747 |
| 5,977,964 A | | 11/1999 | Williams et al. | |
| 6,104,922 A | * | 8/2000 | Baumann .................. 455/410 |
| 6,177,931 B1 | * | 1/2001 | Alexander et al. ............ 725/52 |
| 6,289,514 B1 | * | 9/2001 | Link et al. .................. 725/14 |
| 6,298,482 B1 | * | 10/2001 | Seidman et al. ............. 725/101 |
| 6,457,010 B1 | * | 9/2002 | Eldering et al. .............. 707/10 |
| 6,467,089 B1 | * | 10/2002 | Aust et al. .................. 725/13 |
| 6,530,083 B1 | * | 3/2003 | Liebenow .................. 725/46 |
| 6,637,029 B1 | * | 10/2003 | Maissel ..................... 725/46 |
| 6,697,103 B1 | * | 2/2004 | Fernandez et al. ............ 348/143 |

(Continued)

FOREIGN PATENT DOCUMENTS

EP    0 262 757    4/1988

(Continued)

OTHER PUBLICATIONS

International Preliminary Examination Report for PCT/US02/18328, Feb. 2, 2003.

(Continued)

*Primary Examiner* — Annan Q Shang
(74) *Attorney, Agent, or Firm* — Hanley, Flight & Zimmerman, LLC

(57) ABSTRACT

An audience measurement system determines the likelihood that an audience member is in the audience of a receiver during a particular day part. If the audience member is not likely to be in the audience of the receiver during that day part, the audience member is prompted to enter an audience member identification. On the other hand, if the audience member is likely to be in the audience of the receiver during that day part, prompting of the audience member to enter an audience member identification is suppressed.

142 Claims, 8 Drawing Sheets

U.S. PATENT DOCUMENTS

| | | |
|---|---|---|
| 7,150,030 B1 | 12/2006 | Eldering et al. |
| 2002/0059218 A1 | 5/2002 | August et al. |
| 2002/0059584 A1* | 5/2002 | Ferman et al. ............... 725/34 |
| 2002/0083468 A1* | 6/2002 | Dudkiewicz ............... 725/133 |
| 2002/0174183 A1* | 11/2002 | Saeidi ............... 709/206 |
| 2003/0088872 A1* | 5/2003 | Maissel et al. ............... 725/46 |
| 2003/0225696 A1* | 12/2003 | Niwa ............... 705/50 |
| 2004/0058675 A1* | 3/2004 | Lu et al. ............... 455/418 |
| 2005/0149964 A1* | 7/2005 | Thomas et al. ............... 725/9 |

FOREIGN PATENT DOCUMENTS

| | | |
|---|---|---|
| EP | 1 026 847 | 8/2000 |
| MX | 260844 | 9/2008 |
| WO | WO 99/27668 | 6/1999 |
| WO | WO 99/33206 | 7/1999 |
| WO | 00/72484 | 11/2000 |

OTHER PUBLICATIONS

Office Action, issued by the Canadian Patent Office on Mar. 15, 2010, in connection with Canadian Application No. 2,450,226 (5 pages).

Canadian Intellectual Property Office, "Office Action" issued in connection with Canadian Application No. 2,450,226, Jul. 5, 2011 (2 pages).

New Zealand Intellectual Property Office, "Letters Patent," issued in connection with New Zealand Patent Application No. 530015, (1 page).

New Zealand Intellectual Property Office, "Notice of Acceptance of Complete Specification," issued in connection with New Zealand Patent Application No. 530015, Jul. 18, 2005, (1 page).

New Zealand Intellectual Property Office, "Examination Report," issued in connection with New Zealand Patent Application No. 530015, Jul. 12, 2005, (1 page).

New Zealand Intellectual Property Office, "Examination Report," issued in connection with New Zealand Patent Application No. 530015, Mar. 10, 2004, (1 page).

Instituto Mexicano De La Propiedad Industrial, "First Office Action and Partial Translation," issued in connection with Mexican Patent Application No. PA/a/2003/011490, Jun. 21, 2006, (4 pages).

Instituto Mexicano De La Propiedad Industrial, "Second Office Action and Partial Translation," issued in connection with Mexican Patent Application No. PA/a/2003/011490, Mar. 2, 2007, (6 pages).

Instituto Mexicano De La Propiedad Industrial, "Third and Final Office Action and Partial Translation," issued in connection with Mexican Patent Application No. PA/a/2003/011490, Nov. 6, 2007, (6 pages).

Malaysian Patent Registration Office, "Examiner's Report to the Registrar," issued in connection with Malaysian Patent Application No. PI 20034676, Jul. 3, 2007, (9 pages).

CIPRO, "Grant of Patent Certificate," issued in connection with South African Patent Application No. 200319740, on Dec. 29, 2004, (1 page).

CIPRO, "Acceptance of Complete Specification," issued in connection with South African Patent Application No. 2003/9740, on Oct. 4, 2004, (1 page).

Government of India Patent Office, "First Examination Report," issued in connection with Indian Patent Application No. 1984/CHENP/2003, on Oct. 16th, 2006, (2 pages).

* cited by examiner

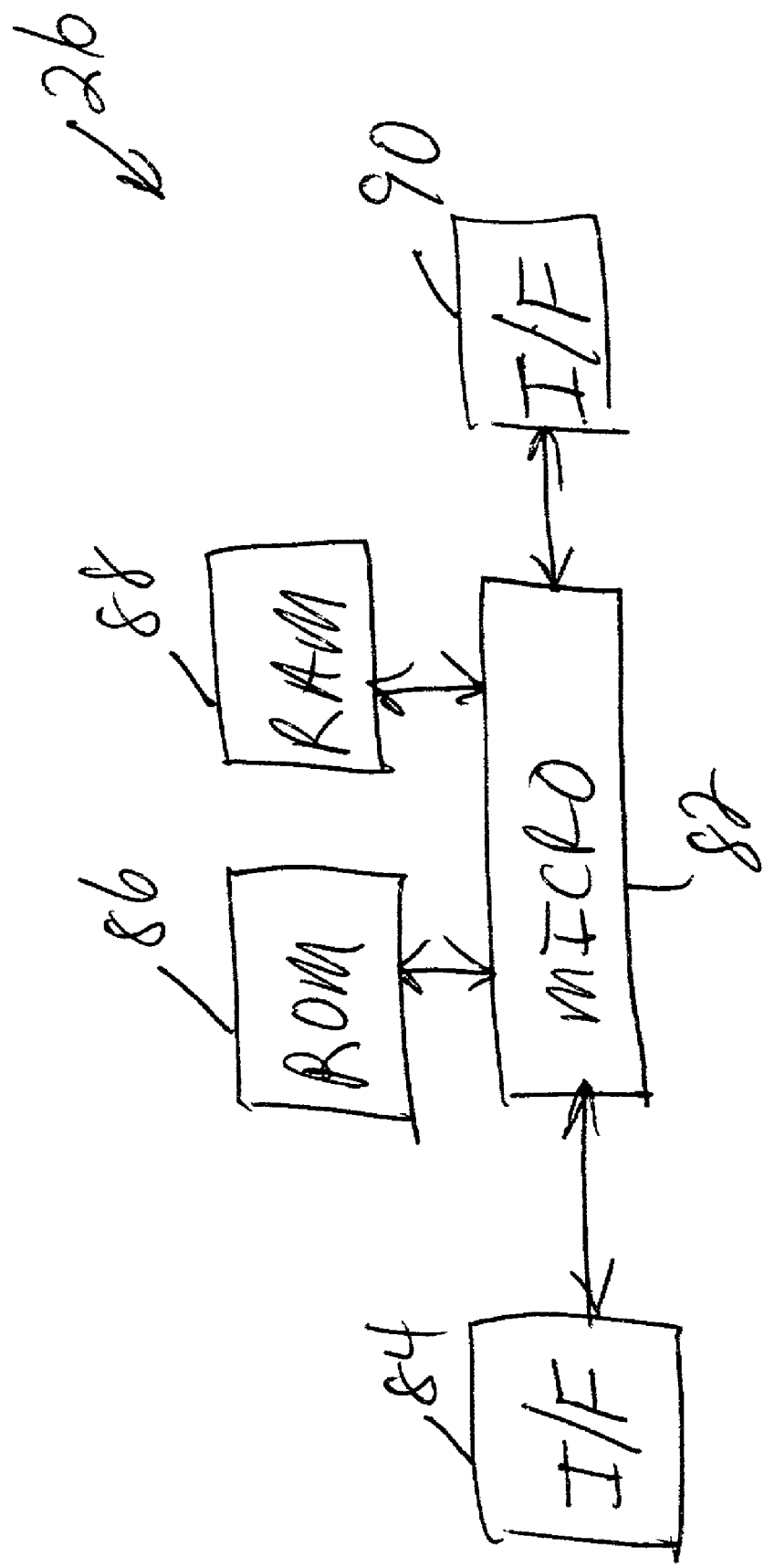

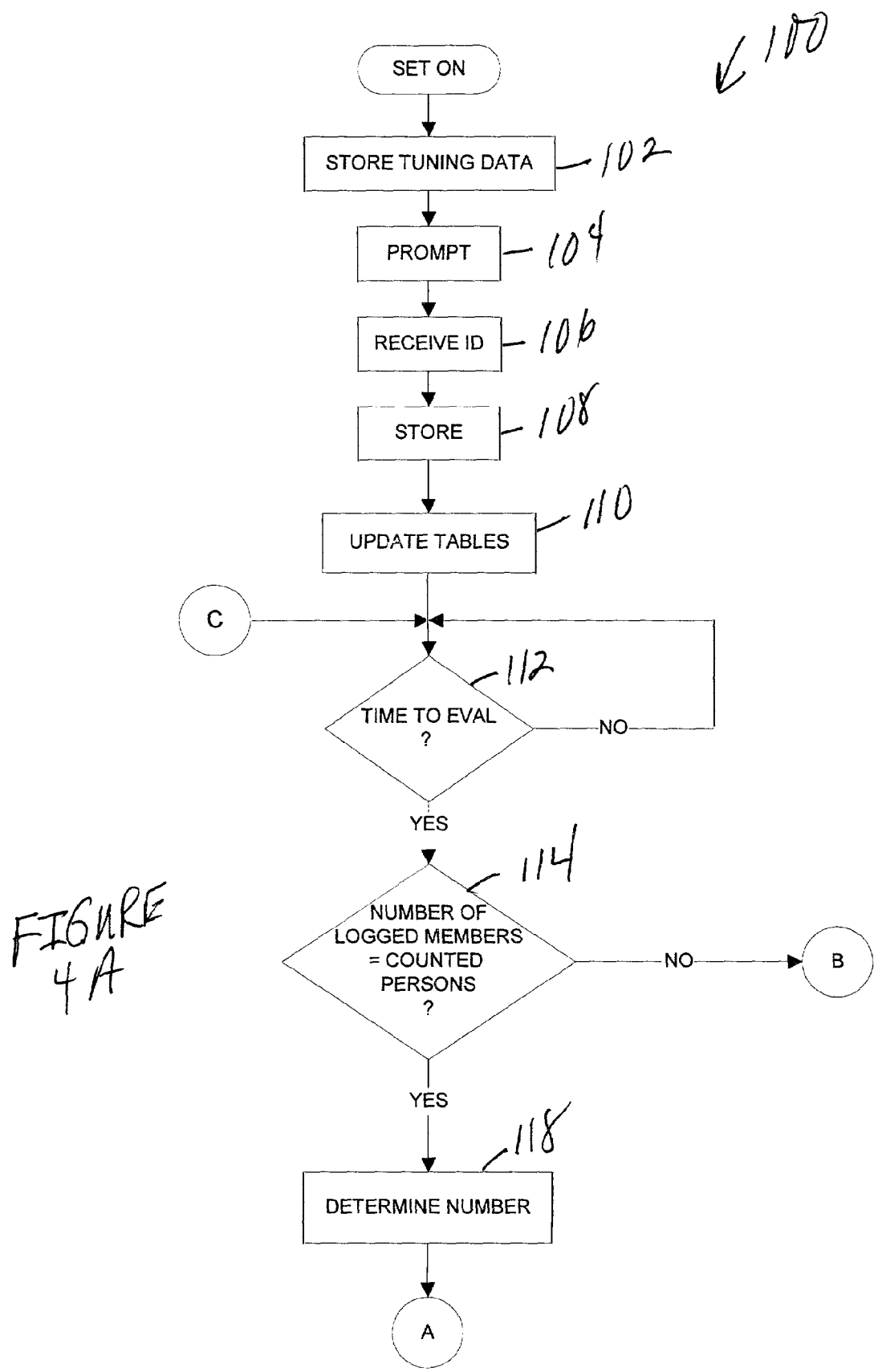

FIGURE 5

| SID Total Jan-01 | | Half Hour | | | | | | | |
|---|---|---|---|---|---|---|---|---|---|
| | | 6AM | 6:30AM | 7AM | 7:30AM | 6PM | 6:30PM | 7PM | 7:30PM |
| F 35-49 | | | | | | | | | |
| | Bedroom | 18 | 19 | 22 | 21 | 8 | 8 | 8 | 10 |
| | Living Room | | | | | 8 | 8 | 8 | 10 |
| | Kitchen | | | | | 2 | 2 | 2 | 2 |
| M 35-49 | | | | | | | | | |
| | Bedroom | 1 | 1 | 1 | 1 | 1 | | 1 | 1 |
| | Living Room | 1 | 1 | | | 1 | | 1 | 1 |
| | Kitchen | | | | | | | | |
| F 12-17 | | | | | | | | | |
| | Bedroom | | | | | | | | |
| | Living Room | 3 | 3 | 2 | 1 | 14 | 15 | 11 | 11 |
| | Kitchen | | | | | | | | |
| Tuning Occasions | | | | | | | | | |
| | Bedroom | 18 | 19 | 22 | 21 | 8 | 8 | 9 | 9 |
| | Living Room | 3 | 3 | 2 | 1 | 15 | 17 | 11 | 11 |
| | Kitchen | | | | | 2 | 2 | 2 | 2 |
| Counts | | | | | | | | | |
| | Bedroom | 19 | 20 | 23 | 22 | 9 | 8 | 9 | 11 |
| | Living Room | 4 | 4 | 2 | 1 | 23 | 23 | 20 | 22 |
| | Kitchen | 0 | 0 | 0 | 0 | 2 | 2 | 2 | 2 |

| SID 11 Jan-01 | Half Hour | | | | | | | | |
|---|---|---|---|---|---|---|---|---|---|
| | | 6AM | 6:30AM | 7AM | 7:30AM | 6PM | 6:30PM | 7PM | 7:30PM |
| F 35-49 | | | | | | | | | |
| | Bedroom | 18 | 19 | 22 | 21 | 6 | 6 | 8 | 10 |
| | Living Room | | | | | 2 | 2 | | |
| | Kitchen | | | | | 1 | 1 | 1 | 1 |
| M 35-49 | | | | | | | | | |
| | Bedroom | 1 | 1 | 1 | 1 | 1 | | 1 | 1 |
| | Living Room | 1 | 1 | | | | | | |
| | Kitchen | | | | | | | | |
| F 12-17 | | | | | | | | | |
| | Bedroom | | | | | | | | |
| | Living Room | 3 | 3 | 2 | 1 | | | 2 | 3 |
| | Kitchen | | | | | | | | |
| Tuning Occasions | | | | | | | | | |
| | Bedroom | 18 | 19 | 22 | 21 | 6 | 6 | 9 | 9 |
| | Living Room | 3 | 3 | 2 | 1 | 1 | 1 | 1 | 1 |
| | Kitchen | | | | | 1 | 1 | 1 | 1 |
| | | | | | | | | | |
| Counts | | | | | | | | | |
| | Bedroom | 19 | 20 | 23 | 22 | 7 | 6 | 9 | 11 |
| | Living Room | 4 | 4 | 2 | 1 | 2 | 2 | 2 | 3 |
| | Kitchen | 0 | 0 | 0 | 0 | 1 | 1 | 1 | 1 |

SID 12
Jan-01

| | | Half Hour | | | | | | | |
|---|---|---|---|---|---|---|---|---|---|
| | | 6AM | 6:30AM | 7AM | 7:30AM | 6PM | 6:30PM | 7PM | 7:30PM |
| F 35-49 | | | | | | | | | |
| | Bedroom | | | | | 2 | 2 | | |
| | Living Room | | | | | 6 | 6 | 8 | 10 |
| | Kitchen | | | | | 1 | 1 | 1 | 1 |
| M 35-49 | | | | | | | | | |
| | Bedroom | | | | | | | | |
| | Living Room | | | | | 1 | | 1 | 1 |
| | Kitchen | | | | | | | | |
| F 12-17 | | | | | | | | | |
| | Bedroom | | | | | | | | |
| | Living Room | | | | | 14 | 15 | 9 | 8 |
| | Kitchen | | | | | | | | |
| Tuning Occasions | | | | | | | | | |
| | Bedroom | | | | | 2 | 2 | | |
| | Living Room | | | | | 14 | 16 | 10 | 10 |
| | Kitchen | | | | | 1 | 1 | 1 | 1 |
| | | | | | | | | | |
| Counts | | | | | | | | | |
| | Bedroom | 0 | 0 | 0 | 0 | 2 | 2 | 0 | 0 |
| | Living Room | 0 | 0 | 0 | 0 | 21 | 21 | 18 | 19 |
| | Kitchen | 0 | 0 | 0 | 0 | 1 | 1 | 1 | 1 |

SID Total
Jan-01

| | | Half Hour | | | | | | | |
|---|---|---|---|---|---|---|---|---|---|
| | | 6AM | 6:30AM | 7AM | 7:30AM | 6PM | 6:30PM | 7PM | 7:30PM |
| F 35-49 | | | | | | | | | |
| | Bedroom | 18 | 19 | 22 | 21 | 8 | 8 | 8 | 10 |
| | Living Room | | | | | 8 | 8 | 8 | 10 |
| | Kitchen | | | | | 2 | 2 | 2 | 2 |
| M 35-49 | | | | | | | | | |
| | Bedroom | 1 | 1 | 1 | 1 | 1 | | 1 | 1 |
| | Living Room | 1 | 1 | | | 1 | | 1 | 1 |
| | Kitchen | | | | | | | | |
| F 12-17 | | | | | | | | | |
| | Bedroom | | | | | | | | |
| | Living Room | 3 | 3 | 2 | 1 | 14 | 15 | 11 | 11 |
| | Kitchen | | | | | | | | |
| Tuning Occasions | | | | | | | | | |
| | Bedroom | 18 | 19 | 22 | 21 | 8 | 8 | 9 | 9 |
| | Living Room | 3 | 3 | 2 | 1 | 15 | 17 | 11 | 11 |
| | Kitchen | | | | | 2 | 2 | 2 | 2 |
| | | | | | | | | | |
| Counts | | | | | | | | | |
| | Bedroom | 19 | 20 | 23 | 22 | 9 | 8 | 9 | 11 |
| | Living Room | 4 | 4 | 2 | 1 | 23 | 23 | 20 | 22 |
| | Kitchen | 0 | 0 | 0 | 0 | 2 | 2 | 2 | 2 |

FIGURE 8

PROMPTING OF AUDIENCE MEMBER IDENTIFICATION

TECHNICAL FIELD OF THE INVENTION

The present invention relates to the prompting of audience members to identify themselves when they are in a receiving area associated with a receiver whose use is being metered.

BACKGROUND OF THE INVENTION

It is customary in the field of audience research to employ a measurement apparatus with each program receiver within each of a plurality of statistically selected locations in order to determine tuning data. Program receivers include television receivers, radio receivers, computers, and/or other devices capable of being tuned to programs that are distributed over the air, over cable systems, by way of satellites, etc. Tuning data, for example, includes the identity of the channel or station to which the program receiver is tuned and/or the identity of the program to which the program receiver is tuned.

It is further customary to provide a manual input 20 device that can be used by those audience members who are actually in an audience of a receiver to indicate their identities to the measurement apparatus. This manual input is frequently provided in the form of a Peoplemeter which not only allows each audience member to manually enter a corresponding audience member identification but also provides a visual status indicator for showing which of the audience members have indicated that they are currently in the receiver's audience. For example, this visual status indicator may comprise a plurality of selectively illuminated light emitting diodes disposed on a box placed adjacent to a receiver and within the field of view of the audience members.

The manual input device alternatively may be a battery-powered remote control or other remote device that includes a keypad and an infra-red pulse transmitter which permit an audience member to manually enter the member's identity and to transmit that identity by way of infra-red pulses to the measurement apparatus or other data collector. The measurement apparatus or other data collector also provides a visual status indication as discussed above. An exemplary remote control of this type is disclosed by Kiewit in U.S. Pat. No. 4,876,736. Still other alternative devices which collect manually entered audience member identification data and which use the receiver to indicate the currently recorded audience status are known.

The tuning data from the measurement apparatus and the audience member identities from the manual input device are commonly time stamped with the times of each tuning event and/or of each change in audience composition. The time stamped tuning and audience member records are then stored in a store and forward unit within the statistically selected location for subsequent forwarding to a data collection central office, such as on a daily or other basis.

Because audience members forget from time to time to enter their identities, it is known to prompt the audience members to manually enter their identities. However, it is well known in audience measurement that systems relying on prompting signals sent to cooperating audience members must be concerned about the frequency of those prompting signals. If a cooperating individual perceives the prompting signals as being so frequent as to be annoying, he or she may stop cooperating. On the other hand, if the prompting is too infrequent, the cooperating individual may forget to enter data at appropriate times.

McKenna et al., in U.S. Pat. No. 4,816,904, discloses an arrangement in which a prompting message is displayed on a television screen overlaid on viewer selected programming by mixing the prompting message with the video signal being sent to the display. However, McKenna et al. do not teach how to effectively regulate the prompting frequency.

Therefore, the present invention is directed to the use of tuning and/or audience response data in an adaptive prompting algorithm to select the frequency with which prompting occurs.

SUMMARY OF THE INVENTION

In accordance with one aspect of the present invention, a method of prompting an audience member to enter an audience member identification into an audience meter comprises the following: determining a probability that the audience member is in an audience of a receiver; prompting the audience member to enter the audience member identification if the probability that the audience member is in the audience of the receiver is less than a threshold; and, suppressing prompting of the audience member if the probability that the audience member is in the audience of the receiver is greater than the threshold.

In accordance with another aspect of the present invention, a method of prompting an audience member to enter an audience member identification into an audience meter comprises the following: determining a variable as a function of a number of times that the audience member was in an audience of a receiver and a number of times that the receiver was turned on; prompting the audience member to enter the audience member identification if the variable is not greater than a threshold; and, suppressing prompting of the audience member if the variable is greater than the threshold.

In accordance with yet another aspect of the present invention, a method of prompting an audience member to enter an audience member identification into an audience meter comprises the following: prompting the audience member to enter the audience member identification at intermittent prompting occasions; at each prompting occasion, determining a likelihood based upon past audience composition and tuning habits that the audience member is in an audience of a receiver; and, suppressing prompting of the audience member if the determination made at a corresponding prompting occasion indicates that it is likely that the audience member is in the audience of the receiver.

In accordance with still another aspect of the present invention, a method of prompting an audience member to enter an audience member identification into an audience meter comprises the following: applying a heuristic to determine whether the audience member is in an audience of a receiver; counting the audience members in the audience of the receiver to produce a count; prompting the audience member to enter the audience member identification if the heuristic indicates that the audience member is not in the audience of the receiver and if the count is not equal a number of logged in audience members; and, suppressing prompting of the audience member if the heuristic indicates that the audience member is in the audience of the receiver and if the count is equal the number of logged in audience members.

In accordance with a further aspect of the present invention, a method of prompting an audience member to enter an audience member identification into an audience meter comprises the following: determining a probability that the audience member is in an audience of a receiver based upon both tuning history and tuning style; prompting the audience member to enter the audience member identification if the probability that the audience member is in the audience of the receiver is less than a threshold; and, suppressing prompting of the audience member if the probability that the audience member is in the audience of the receiver is greater than the threshold.

In accordance with a still further aspect of the present invention, a method of prompting an audience member to enter an audience member identification into an audience meter comprises the following: determining a variable as a function of a number of times that the audience member was in an audience of a receiver and a number of times that the receiver was turned on; determining a probability that the audience member is in an audience of a receiver based upon tuning style; prompting the audience member to enter the audience member identification if the variable is not greater than a first threshold and if the probability is not greater than a second threshold; and, suppressing prompting of the audience member if the variable is greater than the threshold and if the probability is greater than a second threshold.

BRIEF DESCRIPTION OF THE DRAWINGS

These and other features and advantages of the present invention will become more apparent from a detailed consideration of the invention when taken in conjunction with the drawings in which:

FIG. 3 is a schematic diagram of a data storage and forwarding unit of the audience measurement system shown in FIG. 1;

FIGS. 4A and 4B form a flow chart of a prompting program that may be used in connection with the audience measurement system of FIG. 1; and, FIGS. 5-8 are tables of exemplary data useful in the explanation of the operation of the audience measurement system of FIG. 1.

DETAILED DESCRIPTION OF THE INVENTION

Figure 1:
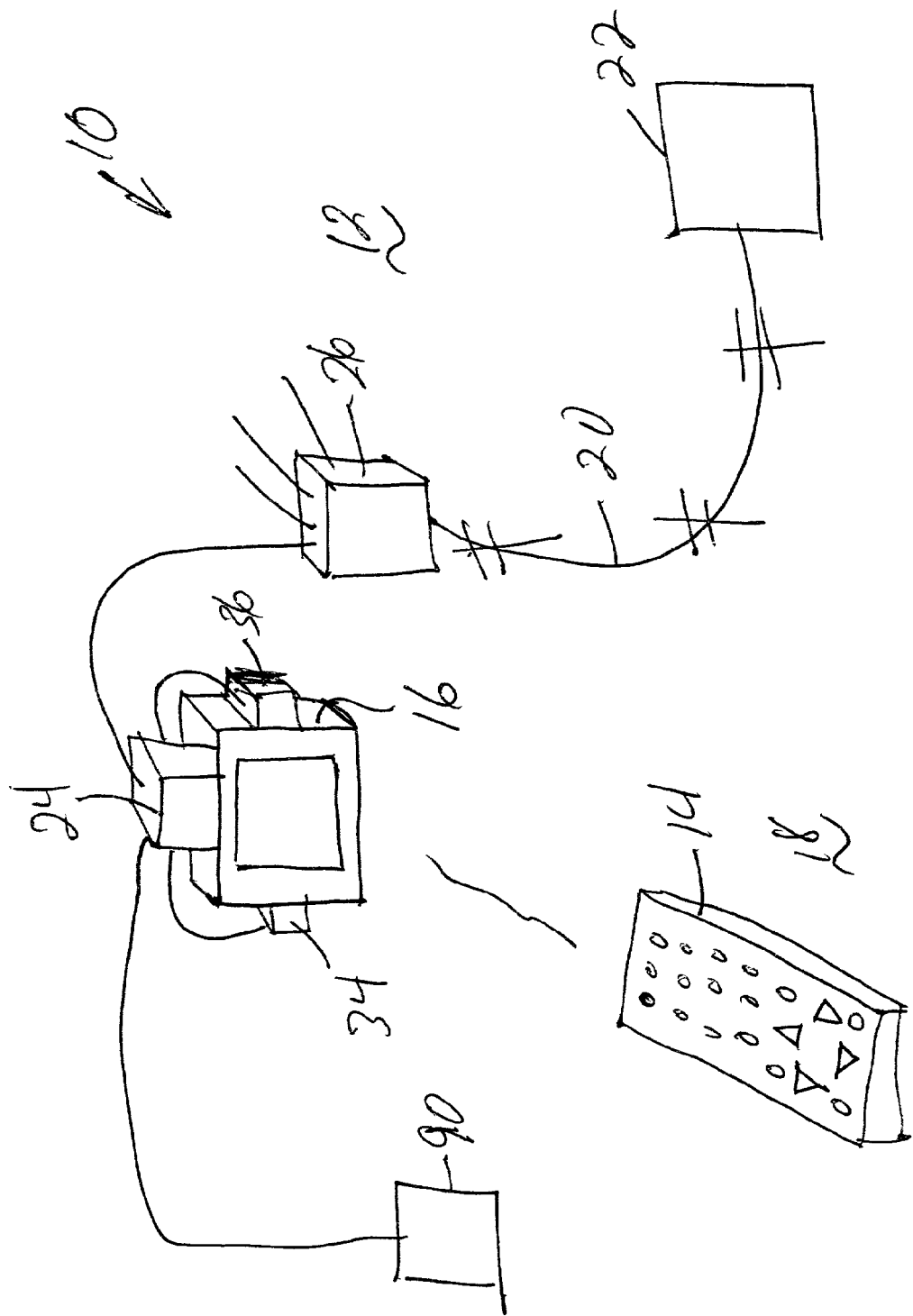
FIG. 1 is a schematic diagram of an audience measurement system in accordance with an exemplary embodiment the present invention.

As shown in FIG. 1, an audience measurement system 10 is provided at a statistically selected location 12 in which known audience members are present. The statistically selected location 12, for example, may be a household. The audience measurement system 10 includes a portable remote control device 14 which controls a receiver 16. The receive 16, for example, may be a television receiver as shown in FIG. 1, although the receiver 16 could instead be a radio, a computer, or any other receiver that is capable of being tuned to programs distributed over the air, over cable, by way of satellite, or by way of other communication methodology to the statistically selected location 12.

The portable remote control device 14 may have a user interface such as a keypad which includes buttons to allow an audience member to enter channel numbers, to change channels up and down, to increase and decrease volume, to mute the receiver 16, and to turn the receiver 16 on and off. Thus, the portable remote control device 14 can be used from a remote position 18 in order to change the channel, volume level, and so on of the receiver 16.

The keypad of the portable remote control device may also permit audience members to identify themselves when they are in the audience of the receiver 16. The names and appropriate demographic information of each of the audience members may be associated with a corresponding one of the buttons of the keypad and may be suitably stored in an appropriate memory. Accordingly, when an audience member presses a button for identification purposes, the time and date of the press, the appropriate identification, and the appropriate demographic information may be stored with the corresponding tuning data.

The audience measurement system 10 is arranged to log data on audience membership (hereinafter "audience member identification data"). The audience measurement system 10 may be arranged to also log tuning data regarding the programs and/or channels to which the receiver 16 is tuned. Periodically, the logged data is transmitted over a network 20 to a data collection central office 22. The network 20 may be any mechanism for conveying the logged data to the data collection central office 22. For example, the network 20 may be a public switched telephone network, as is conventional practice in the audience measurement art.

The portable remote control device 14 may be used to enter member identification data into a measurement apparatus 24 which is installed adjacent to the receiver 16. The measurement apparatus 24 may also be arranged to acquire tuning data from the receiver 16 in any conventional manner in addition to the audience member identification data acquired from the portable remote control device 14. Additionally or alternatively, the audience member identification data may be entered by devices other than the portable remote control device 14. For example, a Peoplemeter may be used to enter member identification data into the measurement apparatus 24 as discussed above. Additionally or alternatively, the audience member identification data may be entered by use of switches mounted directly on the measurement apparatus 24, or the audience member identification data may be entered into the measurement apparatus 24 by use of an electronic program guide (EPG). If an EPG is used, the EPG may also be used to enter tuning data into the measurement apparatus 24. The acquired tuning and audience member identification data can be communicated to the data collection central office 22 by a variety of techniques known to those skilled in the art.

The audience measurement system 10 includes a data storage and forwarding unit 26 which collects the tuning and audience member identification data from the measurement apparatus 24 and which stores the tuning and audience member identification data until a scheduled forwarding time when the tuning and audience member identification data are forwarded to the data collection central office 22. The data storage and forwarding unit 26 may also store and forward tuning and audience member identification data collected from a measurement apparatus, similar to the measurement apparatus 24, associated with each of the other receivers (not shown) located in the statistically selected location 12. The audience measurement system 10, the measurement apparatus 24, and/or the data storage and forwarding unit 26 may be referred to herein as an audience meter.

The measurement apparatus 24 can comprise logic and a memory so that the current tuning data can be acquired and determined by the measurement apparatus 24 based upon channel selection inputs from the portable remote control device 14.

Alternatively or additionally, the measurement apparatus 24 may receive a signal replica from a signal detector 34. For example, this signal detector 34 may be in the form of a video signal source detector such as that disclosed by Chan, in U.S. Pat. No. 5,889,548. This video signal source detector may be positioned as taught in the Chan application to acquire a replica of a video signal from an input to a CRT of the receiver 16.

Alternatively or additionally, the signal detector 34 may be in the form of a microphone which acquires a replica of an audio output from a speaker of the receiver 16. Accordingly, the signal detector 34 is arranged to non-intrusively acquire from the receiver 16 a replica of the video and/or audio signal processed by the receiver 16.

The signal replica acquired by the signal detector 34 can then be processed by the measurement apparatus 24 according to a variety of tuning measurement methodologies. For example, (i) an ancillary video and/or audio code (such as a source identification (SID) code) identifying the tuned program or channel can be read from the signal replica, if present, (ii) video and/or audio feature signatures characteristic of the tuned program can be extracted from the signal replica and compared to reference signatures in order to identify the program or channel, and/or (iii) the signal replica can be correlated with a contemporary reference signal obtained by a reference scanning tuner controlled by the measurement apparatus 24 in order to identify the program or channel.

As a further alternative, the signal detector 34 may be arranged to detect the local oscillator frequency of the receiver 16. This local oscillator frequency indicates the channel to which the receiver 16 is tuned, as is known in the audience measurement art.

Moreover, whether or not the signal detector 34 is employed, the measurement apparatus 24 may receive an ON/OFF input from an ON/OFF sensor 36. The ON/OFF sensor 36, for example, may be an inductive sensor which determines that the receiver 16 is on by detecting the inductive signals emanating from the receiver 16. In the case where the receiver 16 is a television receiver, the ON/OFF sensor 36 may be an inductive sensor which, as is well known, determines that the receiver 16 is on by detecting the horizontal retrace frequency of the CRT of the receiver 16. Alternatively, the ON/OFF sensor 36 may have a photodetector probe positioned in relation to the screen display of the receiver 16 so that changing light levels or the amount of light emanating from the screen display can be used to indicate when the receiver 16 is on or off. Alternatively, the ON/OFF sensor 36 can be any other type of sensor suitably arranged to determine the on/off status of the receiver 16.

In controlling the receiver 16, the portable remote control device 14 preferably operates in the manner of a conventional universal remote control capable of controlling two or more tuner appliances, such as a television receiver, a VCR, and/or a cable converter. Such a universal remote control conventionally uses several different code sets so that it can operate in multiple user-selected modes. One or more of these modes can be used to transmit a tuning or other command (e.g., a fast forward command sent to a VCR) to the currently active tuner (e.g., the tuner of receiver 16 or of a set-top cable converter or of a VCR) controlling the receiver 16. In addition, one of the modes of the portable remote control device 14 is also used to transmit audience member identification data to the measurement apparatus 24.

Optionally, the keypad of the portable remote control device 14 may be provided with dedicated buttons associated with each of the audience members. Accordingly, these dedicated buttons may be used by the audience members exclusively for member identification.

Figure 2:
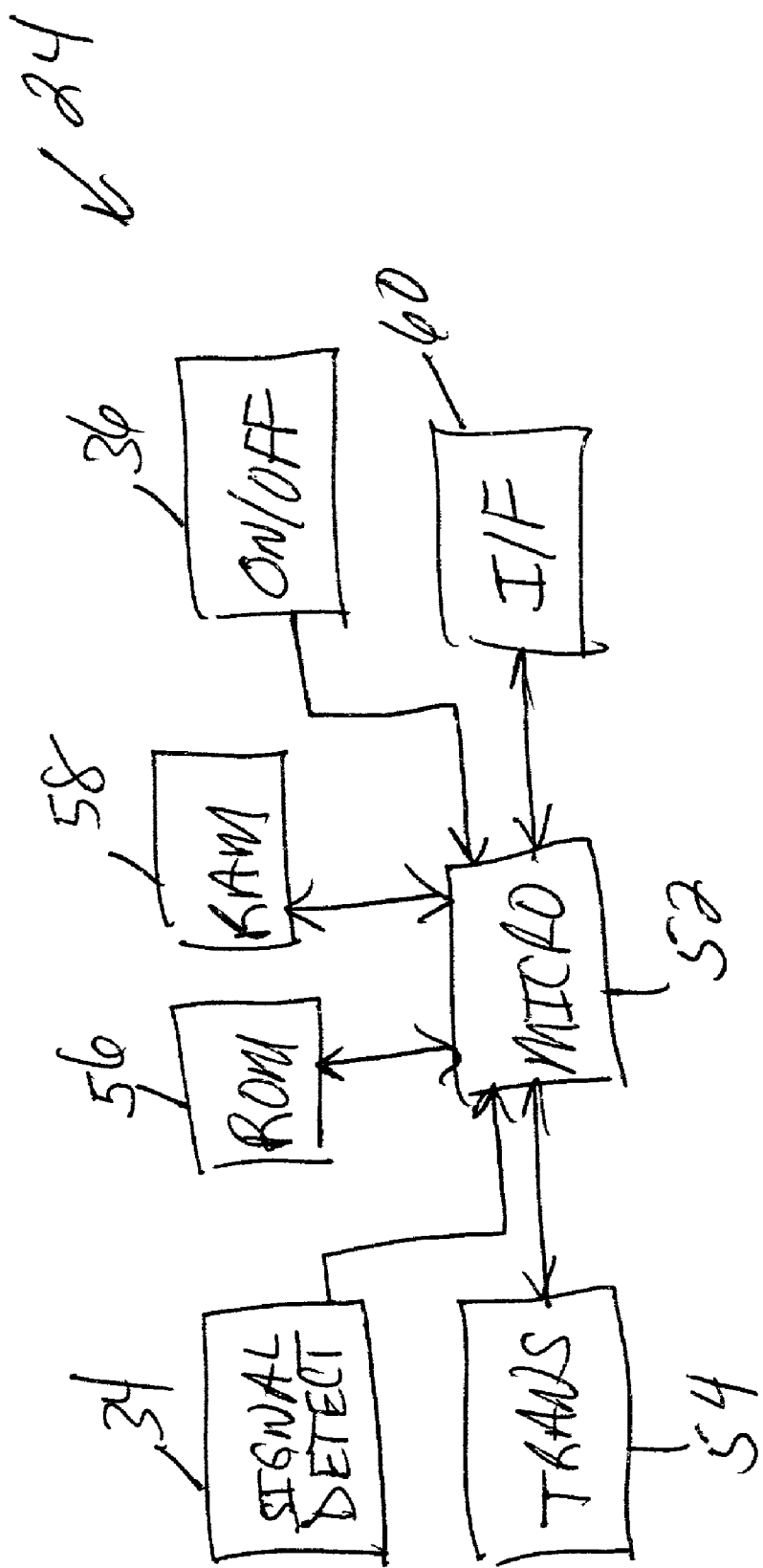
FIG. 2 is a schematic diagram of an audience measurement apparatus of the audience measurement system shown in FIG. 1.

The measurement apparatus 24 as shown in FIG. 2 includes a microprocessor 52 suitably connected to a transceiver 54, the signal detector 34, a ROM 56, a RAM 58, the ON/OFF sensor 36, and an interface 60. The transceiver 54, coupled to the microprocessor 52 executing a program stored in the ROM 56, is used to receive tuning status and/or audience member identification data from the portable remote control device 14. The tuning status data, along with the current audience member identification data and a time stamp, are temporarily saved in the RAM 58. Optionally or alternatively, the measurement apparatus 24 may also respond to the signal detector 34, as discussed above, in order to identify the tuned program from codes, signatures, or correlations, or to determine the tuned channel such as by detecting the local oscillator frequency of the receiver 16. This information can be temporarily stored in the RAM 58. The measurement apparatus 24 additionally may be arranged to determine the ON/OFF status of the receiver 16 from the ON/OFF sensor 36. The ON/OFF status of the receiver 16 is used as discussed below in the prompting of audience members to enter their identifications by use of the portable remote control device 14 (or otherwise) in accordance with a prompting program described below. As discussed above, the measurement apparatus 24 transmits the ON/OFF, tuning, and audience member identification data to the data storage and forwarding unit 26 by means of the interface 60.

Accordingly, the measurement apparatus 24 through execution by the microprocessor 52 of a program stored in the ROM 56 acquires and/or determines tuning data associated with the tuning of the receiver 16 and temporarily stores this tuning data in the RAM 58. The measurement apparatus 24 also acquires and/or determines the ON/OFF status of the receiver 16 and temporarily stores this status in the RAM 58. Moreover, the measurement apparatus 24 receives audience member identification data and temporarily stores this data in the RAM 58. The measurement apparatus 24 through use of the interface 60 communicates any or all of this data to the data storage and forwarding unit 26. For example, the measurement apparatus 24 may communicate this data to the data storage and forwarding unit 26 immediately upon acquisition.

As shown in FIG. 3, the data storage and forwarding unit 26 includes a microprocessor 82 suitably coupled to an interface 84, a ROM 86, a RAM 88, and an interface 90. The interface 84 and the interface 60 support communications between the measurement apparatus 24 and the data storage and forwarding unit 26, and the interface 90 supports communication between the data storage and forwarding unit 26 and the data collection central office 22 as discussed above.

Figure 4B:
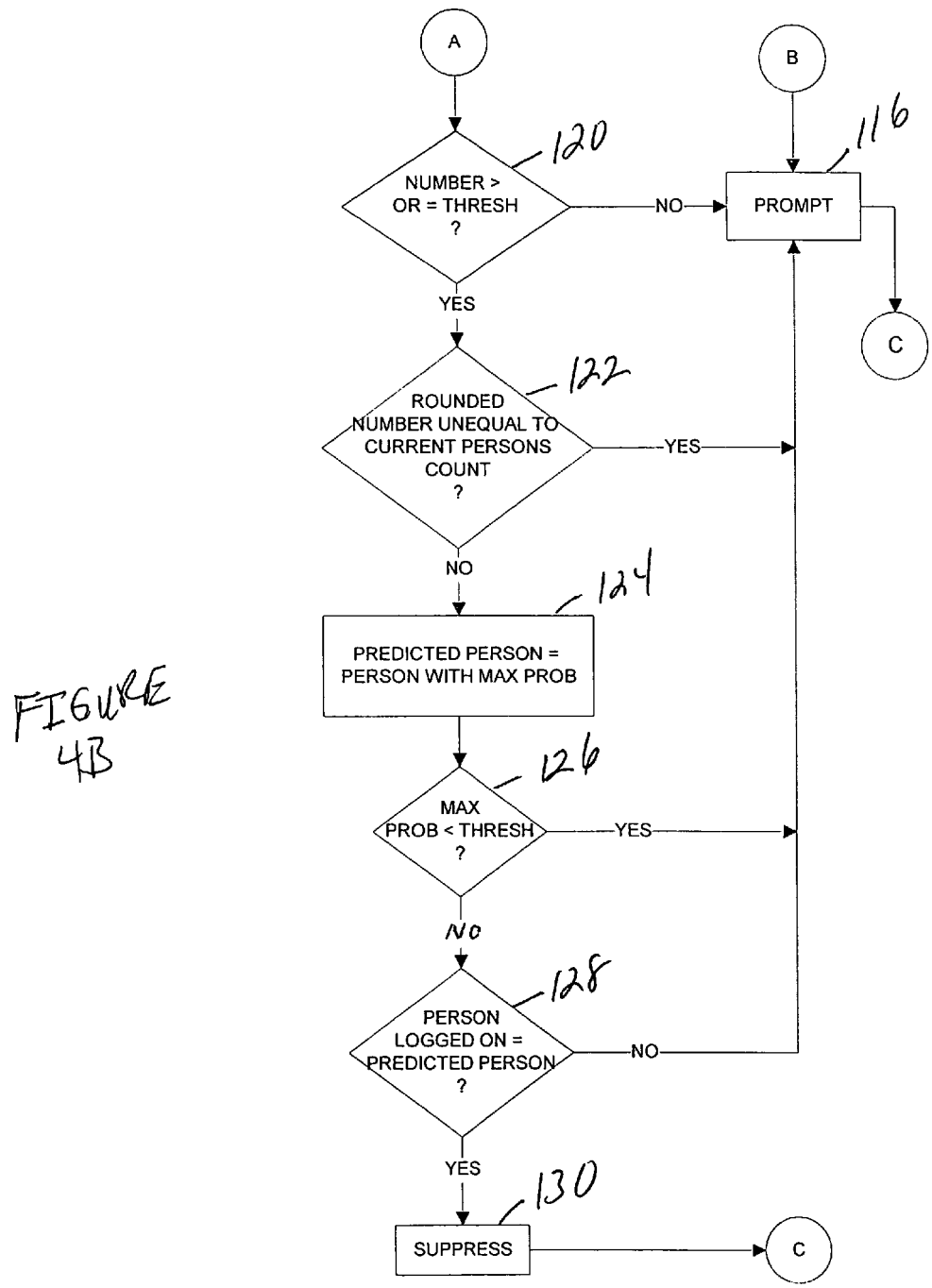

The ROM 86 stores a program 100 represented by the flow chart shown in FIGS. 4A and 4B in order to collect and forward tuning and audience member identification data from each measurement apparatus 24 associated with a corresponding receiver 16 in the statistically selected location 12 and to provide prompting instructions to audience members through the appropriate measurement apparatus 24 so as prompt the audience members to identify themselves. The prompting management implemented by the program 100 relies on audience participation history of each possible audience member, by receiver and by source identification (SID) class. A SID is an ancillary code that is inserted into programs so as to identify the programs or their sources.

Other technologies, such as navigation characteristics, may provide valuable information for prompt management. Navigation characteristics indicate the manner in which certain audience members tune the receiver 16. For example, one of the audience members may channel surf. Thus, any time that channel surfing is detected, the probability that the channel surfing audience member is in the audience may be increased. The program 100 is particularly useful where the measurement apparatus 24 cannot clearly detect channel changes.

An instance of the program 100 as shown in FIGS. 4A and 4B may be provided at the data storage and forwarding unit 26 for each of the receivers at the statistically selected location 12. Alternatively, the program 100 as shown in FIGS. 4A and 4B may be arranged to execute at the data storage and forwarding unit 26 and to accommodate all of the receivers at the statistically selected location 12. As a further alternative, an instance of the program 100 may be provided at the measurement apparatus 24 associated with each of the receivers at the statistically selected location 12.

As shown in FIG. 4A, when the program 100 receives data indicating that the receiver 16 has been turned on, the program 100 at a block 102 acquires tuning data related to the receiver 16 and stores that data in the RAM 88. At a block 104, the program 100 instructs the appropriate measurement apparatus 24 to immediately prompt the audience members in the audience of the receiver 16 to identify themselves. This prompting may be effected by on-screen displays on the receiver 16, by a visible display provided by the measurement apparatus 24 or the portable remote control device 14, by an audible message provided by the measurement apparatus 24 or the portable remote control device 14, etc.

The responsive audience member identification data is received at a block 106. In the case where the audience member identification data is provided by the portable remote control device 14 and the program 100 is executing at the data storage and forwarding unit 26, this audience member identification data is received through use of the transceiver 54 and is communicated to the data storage and forwarding unit 26 by the measurement apparatus 24. Alternatively, the measurement apparatus 24 may be provided with input keys, switches, and the like in which case the measurement apparatus 24 receives the audience member identification data directly and communicates to the data storage and forwarding unit 26. The program 100 at a block 108 stores the audience member identification data in the RAM 58 or the RAM 88, as appropriate, and, at a block 110, also updates the SID class tables as appropriate.

These tables are used by the data storage and forwarding unit 26 to maintain a running accumulator of audience composition. The running accumulator is a count of the number of times each audience member logs onto each of the receivers 16 in the statistically selected location 12 and is maintained by time period and by class of SID code.

The table of FIG. 5 illustrates a single month's accumulation of data for a single household for all SID classes. As the table of FIG. 5 indicates, days are broken into day parts. The table is further broken into the various audience members present in the statistically selected location 12, and the table further breaks down each audience member by receiver. As shown in FIG. 5, the audience members are indicated by their sex and age, and the receivers are indicated by their location (such as bedroom, living room, and kitchen). However, instead of sex and age, other identifiers such as names may be used to identify the audience members, which may be particularly useful where multiple members having the same sex and roughly the same age are present at the statistically selected location 12. Moreover, receiver location identities other that bedroom, living room, and kitchen may be assigned to the receivers used in the statistically selected location 12, which may be particularly useful where there are multiple rooms of the same room type in the statistically selected location 12.

The exemplary data provided in the table of FIG. 5 indicates, for example, that the 35-49 year old female audience member used the receiver in the bedroom eighteen times to receive programs at 6:00 AM during the month covered by the table of FIG. 5, that the 35-49 year old female audience member used the receiver in the bedroom nineteen times to receive programs at 6:30 AM during the month covered by the table of FIG. 5, that the 35-49 year old female audience member used the receiver in the bedroom twenty-two times to receive programs at 7:00 AM during the month covered by the table of FIG. 5, that the 35-49 year old female audience member used the receiver in the bedroom twenty-one times to receive programs at 7:30 AM during the month covered by the table of FIG. 5, and so on. The table holds similar data for the other audience members at the statistically selected location 12 and for other day parts.

The tuning occasions section of the table stores data related to how many times during each day part each receiver 16 at the statistically selected location 12 was used, regardless of the number of audience members in the audience of that receiver during that time and month. Thus, for example, the 35-49 year old female audience member used the receiver in the bedroom eighteen times to receive programs at 6:00 AM during the month covered by the table of FIG. 5, and the 35-49 year old male audience member used the receiver in the bedroom one time to receive a program at 6:00 AM during the month covered by the table of FIG. 5. However, there were only eighteen tuning occasions during which the receiver in the bedroom was used at 6:00 AM for the relevant month, because the 35-49 year old female audience member and the 35-49 year old male audience member used the receiver in the bedroom at 6:00 AM on the same day during the month covered by the table of FIG. 5.

As another example, the 35-49 year old female audience member used the receiver in the living room eight times to receive programs at 6:00 PM during the month covered by the table of FIG. 5, the 35-49 year old male audience member used the receiver in the living room one time to receive a program at 6:00 PM during the month covered by the table of FIG. 5, and the 12-17 year old female audience member used the receiver in the living room fourteen times to receive programs at 6:00 PM during the month covered by the table of FIG. 5. However, there were only fifteen times that the receiver in the living room was on with someone in the audience during the 6:00 PM day part for the relevant month, because on several occasions there were more than one audience members in the audience of the living receiver during that day part. Thus, there were only fifteen tuning occasions during which the receiver in the living room was used at the 6:00 PM day part for the relevant month.

The counts section of the table stores data related to the sum of the data by receiver and day part for the relevant month. Thus, for example, the 35-49 year old female audience member used the receiver in the bedroom eighteen times to receive programs at 6:00 AM during the month covered by the table of FIG. 5, and the 35-49 year old male audience member used the receiver in the bedroom one time to receive a program at 6:00 AM during the month covered by the table of FIG. 5. Thus, the count for the bedroom receiver is 18+1=19 for the 6:00 AM day part for the relevant month.

As another example, the 35-49 year old female audience member used the receiver in the living room eight times to receive programs at 6:00 PM during the month covered by the table of FIG. 5, the 35-49 year old male audience member used the receiver in the living room one time to receive a program at 6:00 PM during the month covered by the table of FIG. 5, and the 12-17 year old female audience member used the receiver in the living room fourteen times to receive programs at 6:00 PM during the month covered by the table of FIG. 5. Thus, the count for the living room receiver is 8+1+ 14=23 for the 6:00 PM day part for the relevant month.

The data in the table of FIG. 5 do not show any SID-specific information, but instead represent a marginal layer collapsing over all SID codes. Data collapsing is useful whenever insufficient data has been collected upon which to make predictions about the audience members in the audience of a receiver at a given day part. For example, data collapsing is particularly useful during the first few months of initial data collection because insufficient data is likely to have been collected upon which to make predictions about the audience members in the audience of a receiver at a given day part.

The table shown in FIG. 5 is only exemplary of the way in which the data may be stored. The data alternatively could be stored in an accumulator table for all sets in the household. This accumulator table is incremented each time there is a change in tuning status or audience composition and includes data for every person, time period, set, and SID class. Thus, the accumulator table may simply log each tuning event and each audience composition event in chronological order.

As a further alternative, such an accumulator table may be used to store data as they are accumulated during a month and then transferred to the type of month table shown in FIG. 5 at the end of the relevant month. Other alternatives are also possible.

The tables store the basic information which is evaluated for each receiver prior to a scheduled prompt. These tables maintained by the measurement apparatus 24 or the data storage and forwarding unit 26 preferably includes four separate tables, a table for the current month, a table for the current month—1, a table for the current month—2, and a total of all months up to and including the current month—3. These tables permit a variable weighting of data by recency of behavior which may be used, for example, during data collapsing.

Thus, this recency weighting is accomplished by combining all four month tables on a weighted basis into a master table that is used for each receiver to determine whether or not to deliver the scheduled prompt to the audience at that receiver. For example, if the recency weights are 2.1, 0.3, 0.3, 0.3, then every cell in the four month tables described above would be combined, giving a weight of 2.1 to the data in the current month table and equal weights of 0.3 to the data in the other three tables.

The program 100 at a block 112 determines whether it is time to evaluate the data in the tables discussed above. For example, the block 112 may use an elapsed time timer such that the block 112 determines that it is time to perform its evaluation when the elapsed time timer accumulates an amount of time T. The time T between evaluations may be set to 42 minutes or any other number of minutes which is deemed appropriate. Accordingly, at T after the receiver 16 has initially been turned on, the program 100 at the block 112 initiates an evaluation of the data stored in the tables to determine if prompting should be suppressed. Thus, a prompt will be given after the passage of T unless the evaluation indicates that prompting should be suppressed.

The evaluation is a probability-based heuristic. The tuning and audience composition history at the statistically selected location 12 is mathematically summarized and represented in multidimensional tables of counts. Each time a prompt is scheduled to be delivered, this information is evaluated, and, if the mathematical structure of audience composition in the household is such that the probability of a specific audience composition exceeds a certain threshold value, then the prompt is suppressed.

The heuristic is an algorithm for parsimoniously summarizing and retrieving knowledge stored in the tables. In a densely populated table, the simplest algorithm would search the cell most similar to the current condition, compute straightforward probabilities for each, and, if the probability of a single tuning composition exceeded a certain threshold, the prompt would be suppressed until the next cycle.

The objective is to determine audience composition. Rather than treating this determination as a problem in combinatorics, this determination may be treated as a problem of individual tuning at a receiver, by SID and day part, but including terms that include co-receiving history and current response to an alternate receiver (co-location).

The operation of the heuristic may be illustrated with the sample frequency tables shown in FIGS. 6, 7, and 8. The tables shown in FIGS. 6 and 7 correspond to the frequency tables for two SID classifications, SID 11 and SID 12. These SID classes, for example, divide the programs by program type such as daytime drama, prime time drama, sports which can be further broken down into subtypes such as football, baseball, etc. Accordingly, Each SID may be assigned to one of these classes. The table in FIG. 8 contains a total of the data in the monthly tables (in the example here, the total of the data in the tables of FIGS. 6 and 7).

If the block 112 determines that it is time to make an evaluation (e.g., time T has passed since the last prompt decision), a block 114 determines whether the number of persons who have logged in (i.e., identified themselves as being in the audience) equals the number of persons who have been counted in the audience. Counting of persons may be implemented by using electric eyes, proximity, or other sensing to count the audience members as they enter and leave a reception area associated with the receiver 16. A counter 90 is shown in FIG. 1 for this purpose. The measurement apparatus 24 collects count information from the counter 90 and passes this count information to the data storage and forwarding unit 26 as appropriate. If the block 114 determines that the number of persons who have logged in is not equal to the number of persons who have been counted in the audience, a block 116 permits the prompt to be given to the audience members at the receiver 16 corresponding to the program 100.

On the other hand, if the block 114 determines that the number of persons who have logged in is equal to the number of persons who have been counted in the audience, a block 118 determines a variable NUMBER as a result of dividing a data value COUNTS by a data value TUOCC. The data value COUNTS is taken from the counts row, at the receiver location, during the day part, and for the SID class corresponding to the current day part and the current SID of the program being received by the receiver corresponding to the program 100. For example, if the current day part is 6:30 AM if the SID from the program being received by the appropriate receiver is in SID class 11, and if the appropriate receiver is the bedroom receiver, the data value for COUNTS is 20.

The data value TUOCC is taken from the tuning occasions row, at the receiver location, during the day part, and for the SID class corresponding to the current day part and the current SID of the program being received by the receiver corresponding to the program 100. For example, if the current day part is 6:30 AM, if the SID from the program being received by the appropriate receiver is in SID class 11, and if the appropriate receiver is the bedroom receiver, the data value for TUOCC is 19.

Therefore, the variable NUMBER is determined as 20/19. If either the numerator or denominator which is used to determine the variable NUMBER falls below a predetermined threshold, it may be necessary to collapse each cell in the tables from right to left (SID, and then receiver) until this threshold is reached because there are otherwise insufficient data in the SID tables on which a prediction can be based. Following such data collapsing, the variable NUMBER may be recomputed.

A block 120 determines whether the variable NUMBER exceeds a corresponding threshold. If the variable NUMBER does not exceeds the corresponding threshold, the block 116 permits the prompt to be given to the audience members at the receiver 16 corresponding to the program 100. On the other hand, if the variable NUMBER exceeds the corresponding threshold, a block 122 rounds NUMBER to the nearest integer and compares the rounded NUMBER to the current persons count. This current persons count may be derived, for example, by summing the number of audience members who have logged into the measurement apparatus 24 at the receiver 16 corresponding to the program 100. Alternatively, the current persons count may be derived by using the sensing described above to count the audience members as they enter and leave a reception area associated with the receiver 16. If the rounded NUMBER is different than the current persons count, the block 116 permits the prompt to be given to the audience members at the receiver 16 corresponding to the program 100.

On the other hand, if the rounded NUMBER is not different than the current persons count, the variable NUMBER is consistent with history as represented by the data in the tables so that the audience members can be further evaluated by the program 100. Therefore, if the rounded NUMBER is not different than the current persons count, a block 124 sets a variable PREDICTED PERSON equal to the person having the maximum probability of being in the audience of the receiver 16 corresponding to the program 100. For example, using the tables of FIGS. 6-8 and as described above, the person having the maximum probability of being in the audience of the bedroom receiver at the current time (6:00 AM+T) watching a program in SID class 11 is the 35-49 year old female. Therefore, the variable PREDICTED PERSON is set to the 35-49 year old female.

Also, the block 124 computes the probability that the PREDICTED PERSON (the 35-49 year old female in the example) is in the audience by dividing the number of times the 35-49 year old female tuned into a program having the relevant SID class and during the current day part by the count for that SID class and day part. For example, the probability that the 35-49 year old female is in the audience of the bedroom receiver which is tuned to a program having the SID class 11 at and during the current time (6:00 AM+T) is 19/20 using the table of FIG. 6. This probability 19/20 may be adjusted by a lead-in adjustment factor $F_{LI}$. This lead in factor $F_{LI}$ is used to adjust the computed probability when the PREDICTED PERSON was in the audience of the relevant receiver during the immediately preceding day part. This lead in factor $F_{LI}$ may be a predetermined number set to a suitable value greater than one and is multiplied by the computed probability in order to increase the computed probability.

Following the processing at the block 124, the program 100 at a block 126 determines whether the probability calculated at the block 124 is less than a predetermined threshold. If the probability calculated at the block 124 is less than this predetermined threshold, the block 116 permits the prompt to be given to the audience members at the receiver 16 corresponding to the program 100. It is noted that there may be insufficient data in the tables at this point during the execution of the program 100, in which case the data may be collapsed as indicated above. However, if the data is so collapsed, it is likely that the probability calculated at the block 124 is less than a predetermined threshold, so that it is correspondingly likely that a prompt will be permitted.

On the other hand, if the probability calculated at the block 124 is not less than the predetermined threshold, the program 100 at a block 128 determines whether the audience member, who is in the audience of the receiver 16 corresponding to the program 100 and who has entered his or her identification into the corresponding measurement apparatus 24, is the PREDICTED PERSON. If the audience member, who is in the audience of the receiver 16 corresponding to the program 100 and who has entered his or her identification into the corresponding measurement apparatus 24, is not the PREDICTED PERSON, the block 116 permits the prompt to be given to the audience members at the receiver 16 corresponding to the program 100.

On the other hand, if the audience member, who is in the audience of the receiver 16 corresponding to the program 100 and who has entered his or her identification into the corresponding measurement apparatus 24, is the PREDICTED PERSON, then the program 100 at a block 130 suppresses prompting.

After the block 116 permits the prompt to be given to the audience members at the receiver 16 corresponding to the program 100, or after the block 130 suppresses prompting, the elapsed time timer used by the block 116 is reset, and the program 100 returns to the block 116 in order to repeat the execution of blocks 112-130 at 6:00 AM+2T and at each increment of T thereafter.

At a particular time during the day, the data storage and forwarding unit 26 communicates its stored tuning and audience member identification data to the data collection central office 22.

Other events may also be used by the block 116 of the program 100 to trigger prompts. Such other events include, for example, a channel change when no audience member is logged in, the passage of a predetermined number of days when a particular household member has not logged in, the passage of a predetermined number of days when a short term visitor has not logged in, no log ins when the receiver 16 is turned on, no log ins of particular household members (such as children) when the receiver 16 is tuned to particular programs (such as children's programming), and the like.

As described above, navigation characteristics may provide valuable information for prompt management. Navigation characteristics indicate the manner in which certain audience members tune the receiver 16. Thus, in the same way that tuning to individual programs or tuning during specific day parts or on specific sets may be correlated with a particular household member as described above, tuning styles may also be associated with individual household members. Accordingly, when tuning patterns are evaluated, the styles in which people select their programs may also be evaluated.

Tuning styles can be described by a variety of terms depending on which paradigm is being used to conceptualize receiver tuning. Tuning styles can be considered to mean or include "navigational patterns", "biometric signatures," or "keystroke dynamics." These styles can be characterized by some very simple "statistics" or by more complex forms of representing knowledge.

"Statistics" are formally defined by mathematicians as a mathematical projection of a vector or set of data onto a single or simple set of parameters. Thus, statistics are used, in effect, to summarize data. A mean is an example of a statistic which may be used to summarize a set of data. However, in summarizing data, certain knowledge about the data, such as variance, kurtosis, skew, and, of course, the exact value of each data point, is lost. Therefore, the statistics used to summarize the data may or may not be sufficient.

"Sufficiency" in theoretical statistics refers to the ability of a "statistic" to reproduce the required detail of a data distribution. In some households, a simple statistic can "sufficiently" represent tuning style. One such statistic is the average number of stations or programs tuned per time period. For example, if one audience member views "appointment television" (i.e, an audience member tunes to a channel carrying a selected program and stays on that channel throughout most or all of the selected program), the average number of stations "hit" per half hour will be very small. But if another audience member is a "surfer," the average number of "hits" per half hour will be much, much larger. While summaries of the tuning habits of these audience members may cause knowledge of variance and skew to be lost, the sheer difference between the average velocities (average rate of channel change) of these two audience members is sufficient to distinguish between these audience members. Thus, in this example, the mean rate of Δ is sufficient to identify the individual.

However, in some households, there may be several members that have the same average rate of channel changing (velocity). In this case, the only way to distinguish these households is to consider channel velocity along with other parameters of tuning which might provide "sufficiency" in order to identify the recent presence of a household member.

For example, for every time period T (e.g., ½ hr), the average number of channels tuned during that half hour may be recorded and stored in the tables of FIGS. 6-8 for every individual logged on to a receiver. However, velocity may not be sufficient to distinguish between people whose "instantaneous rate of change", often called acceleration, is different. For example, two people may average twenty channel hits per half hour with one of the people methodically surfing by watching every other hit for a minute or two, while the other of the two people surfs through twenty channels, finds an appealing program, and then watches for a half hour. The average velocity is not a sufficient statistic to distinguish these two audience members. However, their acceleration can be used to distinguish between them.

There are several statistics that can represent "acceleration." An exemplary statistic to represent acceleration is given by the following description. If it assumed that the time period is thirty minutes, the following ratio may be used to characterize acceleration:

$$\frac{\text{\# of channels in past 30 minutes}}{\text{\# of minutes in which channel was changed in past 30 minutes}}$$

For example, if twenty channels were hit in ten separate minutes of tuning, then the acceleration is 20/10 or a modest 2. On the other hand, if twenty channels were hit in two minutes of surfing, then the acceleration is 20/2 or a moderate ten.

In some homes, even "acceleration" may not be sufficient to distinguish between audience members. For example, it may be the case that where an audience member surfs in a program or channel space is the key to distinguishing between two audience members. Therefore, in such households, a learning heuristic can be used to classify the "cluster of channels" that an audience member surfs and to match this surfing cluster to the "clusters of programs" to which an audience member tunes. Accordingly, classification and matching may be done specifically to distinguish between the channel-surfing patterns of two audience members with similar velocity and acceleration histories.

Accordingly, the probability determined at the block 124 can be adjusted up or down by velocity, acceleration, and/or program clustering. Alternatively, any combination of these factors can be included in the program 100 as one or more decision blocks.

Certain parameters used by the program 100 may be downloadable from the data collection central office 22 to the measurement apparatus 24 or the data storage and forwarding unit 26 and stored in the RAM 58 or the RAM 88. For example, the parameter T may be downloaded.

Certain modifications of the present invention have been discussed above. Other modifications will occur to those practicing in the art of the present invention. For example, it is noted that the portable remote control device 14 may function in several different modes as described above. However, each of these modes may use a separate corresponding remote control.

Also, the present invention as described above relies on the use of certain infrared transceivers. However, it will be appreciated that other signaling modes, such as ultrasonic or spread-spectrum radio, could instead be employed.

In addition, the present invention as described above relies on the use of transceivers. Instead, a separate receiver and transmitter could be used in place of each transceiver.

Moreover, as discussed above, instead of executing the program 100 at the data storage and forwarding unit 26, the program 100 can be executed at each measurement apparatus 24 within the statistically selected location 12. In this case, the data storage tables shown in FIGS. 5-8 may be modified by eliminating the receiver category. Also in this case, the storing and forwarding function performed by the data storage and forwarding unit 26 can be performed by the measurement apparatus 24 so that the data storage and forwarding unit 26 can be eliminated.

Furthermore, as described above, the portable remote control device 14 according to the first embodiment of the invention transmits tuning commands which are received by both the controlled tuner and by the measurement apparatus 24. The controlled tuner responds by effecting the tuning indicated by the tuning command, and the measurement apparatus 24 responds by recording the tuning event. Instead, in accordance with the teachings of U.S. Pat. No. 4,876,736, the portable remote control device 14 may be arranged to transmit tuning commands using codes recognized by the measurement apparatus 24 but not by the tuner of the receiver 16. Thus, the measurement apparatus 24 records the tuning event, converts the code into a form recognized by the tuner of the receiver 16, and passes the converted tuning command on to the tuner of the receiver 16.

Also, a different portable remote control device 14 could be assigned to each person in the household (with additional portable remote control devices provided to visitors). Each person would then carry his or her portable remote control device within the household. The individual's portable remote control device 14 can then be arranged to periodically transit an identification signal to the measurement apparatus 24 either based upon time increments or based upon a command issued by the measurement apparatus 24.

Moreover, the prompting permitted by the block 116 may have multiple levels. For example, at the lowest level, the initial prompt could be flashed for 10 seconds. If the audience responds appropriately, the program 100 resumes normal execution. If the audience does not respond appropriately within a predetermined amount of time (e.g. 20 seconds), and the prompt is flashed for 20 seconds at a higher flash rate. If the audience responds appropriately, the program 100 resumes normal execution. If the audience still does not respond appropriately, the block 116 may be arranged to provide an audible tone or a voice command. Different and/or additional levels of prompting may be provided.

In addition, it may be deemed desirable for audience members to manually update audience composition without prompting as changes in audience composition occur. Prompting serves mainly as a fail-safe, when sufficient time has elapsed without any unprompted change. Therefore, the elapsed time timer used by the block 116 may be reset at each entry of any audience member identification data whether prompted or not.

As an additional contingency, the interval T between prompts could be lengthened or shortened in order to reinforce timely entry of audience changes. This adjustment of T could be based on the data entry performance of audience members. For example, if a particular audience member typically waits until a prompt appears before reporting an earlier audience change, then the data record will show an improbably high proportion of reported audience changes coinciding with the appearance of the prompt. If this pattern of performance is observed, the program 100 may shorten the interval T between prompts. Shortening the interval T between prompts will tend to reduce any possible lags between the occurrence and reporting of audience changes, as well as to provide a mild negative reinforcement for audience members who fail to report audience changes as they occur.

Alternatively or additionally, it is possible that audience members will report audience changes when they occur and that the intervals T between prompts are shorter than the interval during which no audience change actually occurs. If this pattern is observed, it may be that the prompting interval T is shorter than required for this audience member. In this instance, the program 100 may lengthen the interval T between prompts in order to provide a positive reinforcement. Indeed, different prompting intervals T could be set for various audience members, depending on their previous performance.

Furthermore, the heuristic of the present invention as described above relies upon the representation of tuning history and/or style knowledge in the form of a series of probability tables. Such knowledge, however, can be represented in other forms. For example, as receiver tuning events occur, data relating to these events could be stored in a covariance matrix which could then be evaluated through regression, discriminant, or other parametric techniques which would develop prediction scores for each potential household member. Similarly, non-parametric techniques for representing knowledge, such as weighted digraphs, may be used to represent such knowledge. Conceptually, the heuristic has been described above using the simplest form of knowledge representation. However, an important element of the heuristic is its capacity to manage user prompts or questions regardless of how such tuning histories (knowledge) are represented.

Also, as viewed from the standpoint of a meter, audience members have features: what programs they watch, when they watch, with whom they watch, where they watch, and how they change channels. In some households, one or two of these statistics may suffice to discriminate between audience members. In other households, at certain times of day, many of these statistics may be required. Thus, in a more advanced form of the heuristic described above, aperiodic analysis could be conducted in each household to evaluate the structure, among household members, of each of these features. For example, in a two-person household, one person may surf while the other tunes by appointment. This household would be highly structured with respect to acceleration. In this case, the negentropy, or information content ($h^2$) of acceleration, is very high. In an advanced heuristic, the values of each of these features would be weighted by their information content, that is, their ability to discriminate among audience members.

In addition, specific hardware is described in relation to FIGS. 1, 2, and 3. However, it should be understood that other hardware and/or software arrangements may be used to implement the present invention.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method comprising:
   determining a count of audience members in an audience at a first location during a day part of a monitored day;
   determining a first viewing count of a number of times that a first audience member was logged in to a measurement apparatus during the day part of one or more days prior to the monitored day;
   determining a second viewing count of a number of times that a second audience member was logged in to the measurement apparatus during the day part of the one or more days prior to the monitored day;
   determining a first probability that the first audience member is in the audience based on the first viewing count and the second viewing count;
   comparing the first probability to a probability threshold;
   when at least one of the first probability traverses the probability threshold or the count is not equal to a number of audience members that are logged in to the measurement apparatus at the first location, presenting a prompt for user identification; and
   storing an identification of at least one of the audience members.

2. A method as defined in claim 1, further comprising waiting for passage of a predetermined amount of time from a previous prompting decision.

3. A method as defined in claim 1, further comprising determining the program being viewed at the first location.

4. A method as defined in claim 1, further comprising prompting the audience member to enter the audience member identification upon detection that the receiver has been turned on.

5. A method as defined in claim 1, wherein the log of audience members identifies one or more additional audience members of the audience of the program.

6. A method as defined in claim 1, further comprising determining a second probability that the second audience member is in the audience based on the first viewing count and the second viewing count.

7. A method as defined in claim 6, wherein the first audience member is in the audience of the program during a first time interval, the second audience member is in the audience of the program during a second time interval, the second time interval at least partially overlapping the first time interval.

8. A method as defined in claim 1, further comprising: storing audience identification data in tables; and collapsing the tables if the tables contain insufficient data to make a prompting decision.

9. A method as defined in claim 8, wherein the collapsing of the tables is weighted depending upon age of the audience member identification data.

10. A method as defined in claim 1, wherein determining the probability that the audience member is in the audience of the program being viewed at the first location comprises determining a variable as a function of a number of times that the audience member has viewed programs at the first location and a number of times that the measurement apparatus was active.

11. A method as defined in claim 10, wherein the determination of the variable comprises determining the variable as a function of a number of times that the audience member has viewed programs at the first location during a predetermined day part and a number of times that a receiver was turned on during the predetermined day part.

12. A method as defined in claim 10, wherein the determination of the variable comprises determining the variable as a function of a number of times that the audience member has viewed programs at the first location during a predetermined day part over a predetermined amount of time and a number of times that a receiver was turned on during the predetermined day part over the predetermined amount of time.

13. A method as defined in claim 10, wherein the determination of the variable comprises determining the variable as a function of a number of times that the audience member has viewed programs at the first location during a predetermined amount of time and a number of times that a receiver was turned on during the predetermined amount of time.

14. A method as defined in claim 10, wherein the determination of the variable comprises determining the variable as a function of a number of times that the audience member has viewed programs at the first location by a predetermined day part and by a SID and a number of times that a receiver was turned on by the predetermined day part and by the SID.

15. A method as defined in claim 10, wherein the determination of the variable comprises determining the variable as a function of a number of times that the audience member has viewed programs at the first location by a predetermined day part over a predetermined amount of time and by a SID and a number of times that the receiver was turned on during the predetermined day part over the predetermined amount of time and by the SID.

16. A method as defined in claim 10, wherein the determination of the variable comprises determining the variable as a function of a number of times that the audience member has viewed programs at the first location during a predetermined amount of time and by a SID and a number of times that the receiver was turned on during the predetermined amount of time and by the SID.

17. A method as defined in claim 10, wherein the determination of the variable comprises determining the variable as a function of a number of times that the audience member has viewed programs at the first location by a SID and a number of times that the receiver was turned on by the SID.

18. A method as defined in claim 10, further comprising storing audience identification data in tables and collapsing the tables if the tables contain insufficient data to make a prompting decision.

19. A method as defined in claim 18, wherein the collapsing of the tables is weighted depending upon age of the audience member identification data.

20. The method of claim 10, further comprising prompting the audience member to enter the audience member identification when the variable is not equal to a current persons count and is greater than the threshold.

21. A method as defined in claim 1, wherein the first probability is based on a number of times that the audience member has viewed programs at the first location and a number of times that the audience measurement system was turned on.

22. A method as defined in claim 1, further comprising applying a heuristic to determine the probability that the first audience member is in the audience of the program being viewed at the first location.

23. A method as defined in claim 22, further comprising applying the heuristic based upon a number of times that the first audience member viewed programs at the first location during a corresponding day part.

24. A method as defined in claim 22, wherein the application of a heuristic to determine whether the first audience member is in an audience of a receiver comprises determining a variable as a function of a number of times that the first audience member has viewed programs at the first location and a number of times that the measurement apparatus at the first location was turned on.

25. A method as defined in claim 24, wherein the determination of a variable comprises determining the variable as a function of a number of times that the first audience member was has viewed programs at the first location during a predetermined day part and a number of times that the measurement apparatus at the first location was turned on during the predetermined day part.

26. A method as defined in claim 24, wherein the determination of a variable comprises determining the variable as a function of a number of times that the first audience member has viewed programs at the first location during a predetermined day part over a predetermined amount of time and a number of times that the measurement apparatus at the first location was turned on during the predetermined day part over the predetermined amount of time.

27. A method as defined in claim 24, wherein the determination of a variable comprises determining the variable as a function of a number of times that the first audience member has viewed programs at the first location during a predetermined amount of time and a number of times that the measurement apparatus at the first location was turned on during the predetermined amount of time.

28. As defined in method as defined in claim 24, wherein the determination of a variable comprises determining the variable as a function of a number of times that the first audience member has viewed programs at the first location by a predetermined day part and by a SID and a number of times that the measurement apparatus at the first location was turned on by the predetermined day part and by the SID.

29. A method as defined in claim 24, wherein the determination of a variable comprises determining the variable as a function of a number of times that the first audience member has viewed programs at the first location by a predetermined day part over a predetermined amount of time and by a SID and a number of times that the measurement apparatus at the first location was turned on during the predetermined day part over the predetermined amount of time and by the SID.

30. A method as defined in claim 24, wherein the determination of a variable comprises determining the variable as a function of a number of times that the first audience member has viewed programs at the first location during a predetermined amount of time and by a SID and a number of times that the measurement apparatus at the first location was turned on during the predetermined amount of time and by the SID.

31. A method as defined in claim 24, wherein the determination of a variable comprises determining the variable as a function of a number of times that the first audience member has viewed programs at the first location by a SID and a number of times that the measurement apparatus at the first location was turned on by the SID.

32. A method as defined in claim 22, further comprising storing audience identification data in tables; collapsing the tables if the tables contain insufficient data to make a prompting decision.

33. A method as defined in claim 1, wherein the probability is based upon tuning history and tuning style.

34. A method as defined in claim 33, wherein the tuning style comprises at least one of tuning velocity, tuning acceleration, tuning velocity and tuning acceleration, or program clustering.

35. A method as defined in claim 33, further comprising:
storing audience identification data in tables; and
collapsing the tables if the tables contain insufficient data to make a prompting decision.

36. A method as defined in claim 1, further comprising
determining the first probability based upon a tuning style;
determining a variable as a function of a number of times that the audience member has viewed programs at the first location and a number of times that an audience measurement system at the first location was turned on; and
displaying a prompt to the audience member to enter the audience member identification if the variable is not greater than a second threshold and if the probability is not greater than the threshold.

37. A method as defined in claim 36, wherein the tuning style comprises at least one of tuning velocity, tuning acceleration, tuning velocity and tuning acceleration, or program clustering.

38. A method as defined in claim 36, wherein the determination of a variable comprises determining the variable as a function of a number of times that the first audience member has viewed programs at the first location during a predetermined day part and a number of times that the measurement apparatus at the first location was turned on during the predetermined day part.

39. A method as defined in claim 36, wherein the determination of a variable comprises determining the variable as a function of a number of times that the first audience member has viewed programs at the first location during a predetermined day part over a predetermined amount of time and a number of times that the measurement apparatus at the first location was turned on during the predetermined day part over the predetermined amount of time.

40. A method as defined in claim 36, wherein the determination of a variable comprises determining the variable as a function of a number of times that the first audience member has viewed programs at the first location during a predetermined amount of time and a number of times that the measurement apparatus at the first location was turned on during the predetermined amount of time.

41. A method as defined in claim 36, wherein the determination of a variable comprises determining the variable as a function of a number of times that the first audience member has viewed programs at the first location by a predetermined day part and by a SID and a number of times that the measurement apparatus at the first location was turned on by the predetermined day part and by the SID.

42. A method as defined in claim 36, wherein the determination of a variable comprises determining the variable as a function of a number of times that the first audience member has viewed programs at the first location by a predetermined day part over a predetermined amount of time and by a SID and a number of times that the measurement apparatus at the first location was turned on during the predetermined day part over the predetermined amount of time and by the SID.

43. A method as defined in claim 36, wherein the determination of a variable comprises determining the variable as a function of a number of times that the first audience member was has viewed programs at the first location during a predetermined amount of time and by a SID and a number of times that the measurement apparatus at the first location was turned on during the predetermined amount of time and by the SID.

44. A method as defined in claim 36, wherein the determination of a variable comprises determining the variable as a function of a number of times that the first audience member has viewed programs at the first location by a SID and a number of times that the measurement apparatus at the first location was turned on by the SID.

45. The method of claim 36 wherein the method is executed only after the passage of a predetermined amount of time from a previous prompting decision.

46. The method of claim 36 further comprising:
initially displaying a prompt to the first audience member to enter the audience member identification upon detection that the receiver has been turned on; and
executing the method only after the passage of a predetermined amount of time from the initial prompting.

47. A method as defined in claim 1, wherein determining the probability that the person is in the audience comprises:
recording data indicative of historical tuning behavior for the person;
recording data indicative of current tuning behavior; and
comparing the data indicative of current tuning behavior to the data indicative of historical tuning behavior.

48. A method as defined in claim 47, wherein the data indicative of historical tuning behavior comprises at least one of tuning velocity, tuning acceleration, channel clusters, pauses in tuning, subsets of programs tuned, duration of programs viewed, receivers viewed, or times of day.

49. A method as defined in claim 47, wherein recording the data indicative of historical tuning behavior comprises periodically prompting for an audience member identification to associate the data indicative of historical tuning behavior with the individual.

50. A method as defined in claim 49, wherein periods of time between periodic prompts increase over time.

51. A method as defined in claim 49, wherein periods of time between periodic prompts depends upon distinctiveness of the recorded data.

52. A method as defined in claim 1, wherein determining the first probability that the first audience member is in the audience comprises:
recording a first set of data associated with the first audience member;
recording a second set of data associated with the second audience member; and
comparing a recent set of audience inputs to the first and second sets of data.

53. A method as defined in claim 52, wherein comparing the recent set of audience inputs to the first and second sets of data uses at least one statistical difference between the first and second sets of data.

54. A method of distinguishing audience members as defined in claim 52, wherein comparing the recent set of audience inputs to the first and second sets of data comprises comparing at least one of average rate of channel changing, instantaneous rate of channel changing, acceleration of channel changing, subsets of channel viewed, duration of channel viewing, time of day, or direction of channel changing for the recent set of audience inputs to at least one of the first or second set of data.

55. A method as defined in claim 52, wherein recording the set of data associated with the first audience member comprises periodically prompting for an audience member identification to associate recorded data with the first audience member.

56. A method as defined in claim 55, wherein periods of time between periodic prompts increases over time.

57. A method as defined in claim 55, wherein periods of time between periodic prompts depends upon statistical distinctiveness between the first and the second sets of data.

58. A method as defined in claim 1, wherein determining the probability that the first audience member is in the audience comprises:
   detecting a series of tuning events;
   recording a series of time intervals corresponding to time elapsed between sequential pairs of the tuning events; and
   comparing the tuning events to the series of time intervals.

59. A method as defined in 58, wherein identifying the first audience member comprises:
   comparing the series of time intervals to a historical record of time intervals between tuning events associated with a plurality of audience members; and
   identifying which of the audience members caused the tuning events based on the comparison.

60. A method as defined in 58 further comprising at least one of:
   recording a series of channels or program identifiers associated with respective ones of the series of tuning events; or
   recording a series of time references associated with respective ones of the series of tuning events.

61. A method as defined in 60, wherein identifying the first audience member comprises:
   comparing the series of time intervals to a historical record of time intervals between tuning events associated with a plurality of audience members;
   comparing the series of channels or program identifiers to a historical record of tuned channels or programs; and
   identifying which of the audience members caused the tuning events based on the comparisons.

62. A method as defined in 60, wherein identifying the first audience member comprises:
   comparing the series of time intervals to a historical record of time intervals between tuning events associated with a plurality of audience members;
   comparing the series of time references to a historical record of viewing times; and
   identifying which of the audience members caused the tuning events based on the comparisons.

63. A method as defined in claim 1, further comprising adding the first viewing count and the second viewing count to determine a total viewing count, wherein the first probability is based on the total viewing count.

64. A method as defined in claim 1, wherein storing an identification of at least one of the audience members comprises storing an identification of the first audience member.

65. A method as defined in claim 1, further comprising comparing the count of audience members to a number of audience members that are logged in to a measurement apparatus at the first location.

66. A method as defined in claim 1, wherein the first viewing count is based on the number of times that the first audience member was logged in to a second measurement apparatus at a second location.

67. A method as defined in claim 1, wherein the first viewing count is based on the number of times that the first audience member was logged in to the first measurement apparatus during exposure to a first program source.

68. An article of manufacture storing machine readable instructions which, when executed, cause a machine to:
   determine a count of audience members in an audience at a first location during a day part of a monitored day;
   determine a first viewing count of a number of times that a first audience member was logged in to the measurement apparatus during the day part of one or more days prior to the monitored day;
   determine a second viewing count of a number of times that a second audience member was logged in to the measurement apparatus during the day part of the one or more days prior to the monitored day;
   determine a first probability that the first audience member is in the audience based on the first viewing count and the second viewing count;
   compare the first probability to a probability threshold;
   when at least one of the first probability traverses the probability threshold or the count is not equal to a number of audience members that are logged in to the measurement apparatus at the first location, present a prompt for user identification; and
   store an identification of at least one of the audience members.

69. An article of manufacture as defined in claim 68 wherein the machine readable instructions cause the machine to determine the first probability based on a number of times that the audience member has historically viewed programs at the first location.

70. An article of manufacture as defined in claim 69, wherein the machine readable instructions cause the machine to determine the first probability based on a number of times that the measurement apparatus at the first location has been turned on.

71. An article of manufacture as defined in claim 69, wherein the number of times that the audience member was historically in the audience of at first location and the number of times that the measurement apparatus at the first location has been turned on are based on the day part.

72. An article of manufacture as defined in claim 69, wherein the number of times that the audience member was historically in the audience of at the first location and the number of times that the measurement apparatus at the first location has been turned on are based on a source identification (SID) code.

73. An article of manufacture as defined in claim 69, wherein the probability is based upon at least one of tuning style or tuning patterns.

74. An article of manufacture as defined in claim 68, wherein the machine readable instructions cause the machine to determine the first probability using a heuristic.

75. An article of manufacture as defined in claim 74, wherein the heuristic utilizes at least one of: a number of times that the audience member has viewed programs at the first location; a count of audience members; a number of logged in audience members; a predetermined day part; a predetermined program; a predetermined source identification (SID) code; a number of times that an audience measurement system at the first location is turned on; or whether the audience member is logged in.

76. An article of manufacture as defined in claim 68, wherein the machine readable instructions cause the machine to determine the first probability based upon tuning style.

77. An article of manufacture as defined in claim 76, wherein the machine readable instructions cause the machine to determine the first probability based on tuning history.

78. An article of manufacture as defined in claim 76, wherein the machine readable instructions cause the machine to determine the first probability by computing a likelihood based upon past audience composition and tuning habits.

79. An article of manufacture as defined in claim 68 wherein the machine readable instructions cause the machine to suppress displaying a prompt to the audience if the first audience member has already entered the audience member identification.

80. An article of manufacture as defined in claim 68, wherein the machine readable instructions cause the machine to wait a pre-determined amount of time between prompting decisions.

81. An article of manufacture as defined in claim 80, wherein the machine readable instructions cause the machine to initially display a prompt to the audience to enter the audience member identification upon a detection that the measurement apparatus at the first location has been turned on.

82. An article of manufacture as defined in claim 68, wherein the machine readable instructions cause the machine to display a prompt or add the audience member to the log of audience members at intermittent prompting occasions.

83. An article of manufacture as defined in claim 82 wherein the intermittent prompting occasions are nominally separated from one another by a period T, and wherein the period T varies depending upon prior responses to the prompting.

84. An article of manufacture as defined in claim 68, wherein the machine readable instructions cause the machine to:
    store audience identification data in tables; and
    collapse the tables if the tables contain insufficient data to make a prompting decision.

85. An article of manufacture as defined in claim 84 wherein the collapsing of the tables is weighted depending upon age of the audience member identification data.

86. An article of manufacture as defined in claim 68, wherein the machine readable instructions cause the machine to determine the probability that the person is in the audience by:
    recording data indicative of historical tuning behavior for the person;
    recording data indicative of current tuning behavior; and
    comparing the data indicative of current tuning behavior to the data indicative of historical tuning behavior.

87. An article of manufacture as defined in claim 86, wherein the data indicative of historical tuning behavior comprises at least one of tuning velocity, tuning acceleration, channel clusters, pauses in tuning, subsets of programs tuned, duration of programs viewed, receivers viewed, or times of day.

88. An article of manufacture as defined in claim 86, wherein the machine readable instructions cause the machine to periodically prompt for an audience member identification to associate the data indicative of historical tuning behavior with the individual.

89. An article of manufacture as defined in claim 88, wherein the machine readable instructions cause the machine to sequentially increase periods of time between periodic prompts.

90. An article of manufacture as defined in claim 88, wherein the machine readable instructions cause the machine to adjust periods of time between periodic prompts based on distinctiveness of the recorded data.

91. An article of manufacture as defined in claim 68, wherein the machine readable instructions cause the machine to determine the first probability that the first audience member is in the audience by:
    recording a first set of data associated with the first audience member;
    recording a second set of data associated with a second audience member; and
    comparing a recent set of audience inputs to the first and second sets of data.

92. An article of manufacture as defined in claim 91, wherein the machine readable instructions cause the machine to compare the recent set of audience inputs to the first and second sets of data by using at least one statistical difference between the first and second sets of data.

93. An article of manufacture as defined in claim 91, wherein the machine readable instructions cause the machine to compare the recent set of audience inputs to the first and second sets of data by comparing at least one of average rate of channel changing, instantaneous rate of channel changing, acceleration of channel changing, subsets of channel viewed, duration of channel viewing, time of day, or direction of channel changing for the recent set of audience inputs to at least one of the first or second set of data.

94. An article of manufacture as defined in claim 91, wherein the machine readable instructions cause the machine to periodically prompt for an audience member identification to associate recorded data with the first audience member.

95. An article of manufacture as defined in claim 94, wherein the machine readable instructions cause the machine to sequentially increase periods of time between periodic prompts.

96. An article of manufacture as defined in claim 94, wherein the machine readable instructions cause the machine to adjust periods of time between periodic prompts based on statistical distinctiveness between the first and the second sets of data.

97. An article of manufacture as defined in claim 68, wherein the machine readable instructions cause the machine to determine the probability that the first audience member is in the audience by:
    detecting a series of tuning events;
    recording a series of time intervals corresponding to time elapsed between sequential pairs of the tuning events;
    comparing the tuning events to the series of time intervals.

98. An article of manufacture as defined in 97, wherein the machine readable instructions cause the machine to identify the first audience member by:
    comparing the series of time intervals to a historical record of time intervals between tuning events associated with a plurality of audience members; and
    identifying which of the audience members caused the tuning events based on the comparison.

99. An article of manufacture as defined in 97 wherein the machine readable instructions cause the machine to perform at least one of:
    recording a series of channels or program identifiers associated with respective ones of the series of tuning events; or
    recording a series of time references associated with respective ones of the series of tuning events.

100. An article of manufacture as defined in 99, wherein the machine readable instructions cause the machine to identify the first audience member by:
  comparing the series of time intervals to a historical record of time intervals between tuning events associated with a plurality of audience members;
  comparing the series of channels or program identifiers to a historical record of tuned channels or programs; and
  identifying which of the audience members caused the tuning events based on the comparisons.

101. An article of manufacture as defined in 99, the machine readable instructions cause the machine to identify the first audience member by:
  comparing the series of time intervals to a historical record of time intervals between tuning events associated with a plurality of audience members;
  comparing the series of time references to a historical record of viewing times; and
  identifying which of the audience members caused the tuning events based on the comparisons.

102. An article of manufacture as described in claim 68, wherein the machine readable instructions cause the machine to add the first viewing count and the second viewing count to determine a total viewing count, wherein the first probability is based on the total viewing count.

103. An article of manufacture as described in claim 68, wherein storing an identification of at least one of the audience members comprises storing an identification of the first audience member.

104. An article of manufacture as described in claim 68, wherein the machine readable instructions cause the machine to compare the count of audience members to a number of audience members that are logged in to a measurement apparatus at the first location.

105. An article of manufacture as described in claim 68, wherein the first viewing count is based on the number of times that the first audience member was logged in to a second measurement apparatus at a second location.

106. An article of manufacture as described in claim 68, wherein the first viewing count is based on the number of times that the first audience member was logged in to the first measurement apparatus during exposure to a first program source.

107. A measurement apparatus, comprising:
  a memory; and
  a processor coupled to the memory and programmed to:
    determine a count of audience members in an audience at a first location during a day part of a monitored day;
    determine a first viewing count of a number of times that a first audience member was logged in to the measurement apparatus during the day part of one or more days prior to the monitored day;
    determine a second viewing count of a number of times that a second audience member was logged in to the measurement apparatus during the day part of the one or more days prior to the monitored day;
    determine a first probability that the first audience member is in the audience based on the first viewing count and the second viewing count;
    compare the first probability to a probability threshold;
    when at least one of the first probability traverses the probability threshold or the count is not equal to a number of audience members that are logged in to the measurement apparatus at the first location, present a prompt for user identification; and
    store an identification of at least one of the audience members.

108. An apparatus as defined in claim 107, wherein the first probability is computed based upon a number of times that the first audience member has been in an audience at the first location during a corresponding day part.

109. An apparatus as defined in claim 107, wherein the processor is programmed to determine the first probability based on a number of times that the first audience member was historically in an audience at the first location.

110. An apparatus as defined in claim 109, wherein the processor is programmed to determine the first probability based on a number of times that the measurement apparatus at the first location has been turned on.

111. An apparatus as defined in claim 109, wherein the processor is programmed to determine the first probability based upon at least one of tuning style or tuning patterns.

112. An apparatus as defined in claim 107, wherein the processor is programmed to determine the first probability using a heuristic.

113. An apparatus as defined in claim 112, wherein the heuristic utilizes at least one of: a number of times that the first audience member has been in an audience at the first location; a count of audience members; a number of logged in audience members; a predetermined day part; a predetermined program; a predetermined source identification (SID) code; a number of times that an audience measurement system at the first location is turned on; or whether the first audience member is logged in.

114. An apparatus as defined in claim 107, wherein the processor is programmed to determine the first probability based upon tuning style.

115. An apparatus as defined in claim 107, wherein the processor is programmed to determine the first probability based upon audience composition and tuning habits.

116. An apparatus as defined in claim 107, wherein the processor is programmed to suppress presenting a prompt to the audience if the audience has already entered the user identification.

117. An apparatus as defined in claim 107, wherein the processor is programmed to wait a pre-determined amount of time between prompting decisions.

118. An apparatus as defined in claim 107, wherein the processor is programmed to prompt or suppress the prompting at intermittent prompting occasions.

119. An apparatus as defined in claim 118, wherein the intermittent prompting occasions are nominally separated from one another by a period T, and wherein the period T varies depending upon prior responses to the prompting.

120. An apparatus as defined in claim 107, wherein the processor is programmed to:
  store audience identification data in tables; and
  collapse the tables if the tables contain insufficient data to make a prompting decision.

121. An apparatus as defined in claim 107, wherein the processor is programmed to determine the probability that the person is in the audience by:
  recording data indicative of historical tuning behavior for the person;
  recording data indicative of current tuning behavior; and
  comparing the data indicative of current tuning behavior to the data indicative of historical tuning behavior.

122. An apparatus as defined in claim 121, wherein the data indicative of historical tuning behavior comprises at least one of tuning velocity, tuning acceleration, channel clusters, pauses in tuning, subsets of programs tuned, duration of programs viewed, receivers viewed, or times of day.

123. An apparatus as defined in claim 121, wherein the processor is programmed to periodically prompt for an audience member identification to associate the data indicative of historical tuning behavior with the individual.

124. An apparatus as defined in claim 123, wherein the processor is programmed to sequentially increase periods of time between periodic prompts.

125. An apparatus as defined in claim 123, wherein the processor is programmed to adjust periods of time between periodic prompts based on distinctiveness of the recorded data.

126. An apparatus as defined in claim 107, wherein the processor is programmed to determine the first probability that the first audience member is in the audience by:
   recording a first set of data associated with the first audience member;
   recording a second set of data associated with second audience member; and
   comparing a recent set of audience inputs to the first and second sets of data.

127. An apparatus as defined in claim 126, wherein the processor is programmed to compare the recent set of audience inputs to the first and second sets of data by using at least one statistical difference between the first and second sets of data.

128. An apparatus as defined in claim 126, wherein the processor is programmed to compare the recent set of audience inputs to the first and second sets of data by comparing at least one of average rate of channel changing, instantaneous rate of channel changing, acceleration of channel changing, subsets of channel viewed, duration of channel viewing, time of day, or direction of channel changing for the recent set of audience inputs to at least one of the first and second set of data.

129. An apparatus as defined in claim 126, wherein the processor is programmed to periodically prompt for an audience member identification to associate recorded data with the first audience member.

130. An apparatus as defined in claim 129, wherein the processor is programmed to sequentially increase periods of time between periodic prompts.

131. An apparatus as defined in claim 129, wherein the processor is programmed to adjust periods of time between periodic prompts based on statistical distinctiveness between the first and the second sets of data.

132. An apparatus as defined in claim 107, wherein the processor is programmed to determine the probability that the first audience member is in the audience by:
   detecting a series of tuning events;
   recording a series of time intervals corresponding to time elapsed between sequential pairs of the tuning events; and
   comparing the tuning events the series of time intervals.

133. An apparatus as defined in 132, wherein the processor is programmed to identify the first audience member by:
   comparing the series of time intervals to a historical record of time intervals between tuning events associated with a plurality of audience members; and
   identifying which of the audience members caused the tuning events based on the comparison.

134. An apparatus as defined in 132 wherein the processor is programmed to perform at least one of:
   recording a series of channels or program identifiers associated with respective ones of the series of tuning events; or
   recording a series of time references associated with respective ones of the series of tuning events.

135. An apparatus as defined in 134, wherein the processor is programmed to identify the first audience member by:
   comparing the series of time intervals to a historical record of time intervals between tuning events associated with a plurality of audience members;
   comparing the series of channels or program identifiers to a historical record of tuned channels or programs; and
   identifying which of the audience members caused the tuning events based on the comparisons.

136. An apparatus as defined in 134, the processor is programmed to identify the first audience member by:
   comparing the series of time intervals to a historical record of time intervals between tuning events associated with a plurality of audience members;
   comparing the series of time references to a historical record of viewing times; and
   identifying which of the audience members caused the tuning events based on the comparisons.

137. An apparatus as described in claim 107, wherein the processor is further programmed to add the first viewing count and the second viewing count to determine a total viewing count, wherein the first probability is based on the total viewing count.

138. An apparatus as described in claim 107, wherein storing an identification of at least one of the audience members comprises storing an identification of the first audience member.

139. An apparatus as described in claim 107, wherein the processor is further programmed to compare the count of audience members to a number of audience members that are logged in to a measurement apparatus at the first location.

140. An apparatus as described in claim 107, wherein the first viewing count is based on the number of times that the first audience member was logged in to a second measurement apparatus at a second location.

141. An apparatus as described in claim 107, wherein the first viewing count is based on the number of times that the first audience member was logged in to the first measurement apparatus during exposure to a first program source.

142. A method comprising:
   storing, via a logic circuit, a computer readable memory a first audience identification information for one or more audience members of a program being viewed at a first location during a first day part;
   determining, via the logic circuit, if a predetermined interval has passed after which to make a prompting decision;
   determining, via the logic circuit, a count of audience members present in the audience and a number of audience members associated with the stored audience identification information in response to determining the predetermined interval has passed;
   determining an expected number of audience members based on historical tuning information for known audience members during corresponding day parts in response to determining that the count of audience members is equal to the number of audience members associated with the stored audience information;
   determining whether the expected number of audience members is greater than a first threshold in response to determining the expected number;
   determining a first probability that a first audience member is in the audience based on historical tuning information of the first audience member for the corresponding day parts and determining a second probability that a second audience member is in the audience based on historical tuning information of the second audience member for the corresponding day parts in response to the expected number being greater than the first threshold;

determining that the first probability is greater than the second probability;

determining whether the first probability is greater than a second threshold in response to determining that the first probability is greater than the second probability;

determining whether the first audience member is one of the audience members associated with the stored audience identification information based on the first probability being greater than the threshold;

suppressing an identification prompt based on whether the first audience member is one of the audience members associated with the stored audience identification information; and prompting the audience for a second audience identification information in response to failing to suppress the identification prompt.

* * * * *

UNITED STATES PATENT AND TRADEMARK OFFICE
CERTIFICATE OF CORRECTION

PATENT NO. : 8,091,100 B2  Page 1 of 1
APPLICATION NO. : 09/883546
DATED : January 3, 2012
INVENTOR(S) : Paul Donato It is certified that error appears in the above-identified patent and that said Letters Patent is hereby corrected as shown below:

Column 28, line 40 (claim 142): Delete "a computer readable memory"

Signed and Sealed this
Fifteenth Day of May, 2012

David J. Kappos
*Director of the United States Patent and Trademark Office*